(12) United States Patent
Kusaka et al.

(10) Patent No.: US 6,552,332 B2
(45) Date of Patent: Apr. 22, 2003

(54) IMAGE-SENSING APPARATUS

(75) Inventors: Yasushi Kusaka, Mishima-Gun (JP); Satoshi Nakamura, Ikeda (JP); So Yano, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 95 days.

(21) Appl. No.: 09/746,761

(22) Filed: Dec. 21, 2000

(65) Prior Publication Data

US 2001/0007348 A1 Jul. 12, 2001

(30) Foreign Application Priority Data

Jan. 6, 2000 (JP) .................................... 2000-005732

(51) Int. Cl.⁷ ............................................. H01J 40/14
(52) U.S. Cl. .................... 250/238; 348/230.1; 348/244
(58) Field of Search .................... 250/238, 552, 250/559.1, 208.1; 348/230.1, 251, 241, 244; 257/291, 292, 431

(56) References Cited

U.S. PATENT DOCUMENTS

| | | | | |
|---|---|---|---|---|
| 4,885,467 A | * | 12/1989 | Horikawa | 250/327.2 |
| 5,047,861 A | * | 9/1991 | Houchin et al. | 358/213.15 |
| 5,181,118 A | * | 1/1993 | Kimura | 358/213.16 |
| 5,289,286 A | | 2/1994 | Nakamura et al. | 348/223 |
| 6,304,313 B1 | * | 10/2001 | Honma | 355/18 |
| 6,194,712 B1 | * | 2/2002 | Suemoto et al. | 250/234 |

* cited by examiner

*Primary Examiner*—Huy Mai
(74) *Attorney, Agent, or Firm*—Sidley Austin Brown & Wood LLP

(57) ABSTRACT

In an image-sensing apparatus, shading data obtained when a sensor 1 is irradiated with uniform light is compressed by a COM 6 and is then stored in a memory 3. During image sensing, the data stored in the memory 3 is decompressed back into the shading data by an EXP 7. By a COR 4, this shading data is subtracted from the image data obtained from the sensor 1, and thereby the unevenness in the outputs from the individual pixels of the sensor 1 is corrected.

26 Claims, 6 Drawing Sheets

IMAGE-SENSING APPARATUS

This application is based on application No. 2000-5732 filed in Japan on Jan. 6, 2000, the entire contents of which are hereby incorporated by reference.

BACKGROUND OF THE INVENTION

1. Field of the Invention

The present invention relates to an imnge-sensing apparatus, and in particular to an image-sensing apparatus incorporating a solid-state image-sensing device having a characteristic that an output voltage thereof varies natural-logarithmically in accordance with the amount of received light.

2. Description of the Prior Art

Figure 1:
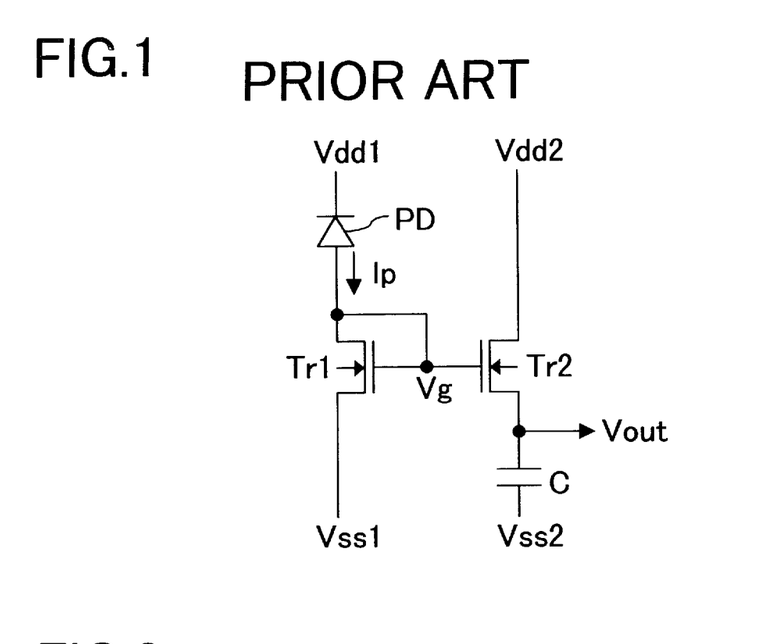
FIG. 1 is a diagram showing the circuit configuration of each of the pixels constituting a solid-state image-sensing device.

FIG. 1 shows a solid-state image-sensing element (hereafter referred to as a "pixel") employed in a conventional solid-state image-sensing device having a characteristic that an output voltage thereof varies natural-logarithmically in accordance with the amount of received light. The pixel shown in FIG. 1 is composed of a photodiode PD that receives at its cathode a voltage Vdd1, an N-channel MOS transistor Tr1 that has its drain and gate connected to the anode of the photodiode PD and that receives at its source a voltage Vss1, an N-channel MOS transistor Tr2 that has its gate connected to the gate of the transistor Tr1 and that receives at its drain a voltage Vdd2, and a capacitor C that has one end connected to the source of the transistor Tr2 and that receives at the other end a voltage Vss2. Here, the voltage appearing at the node between the source of the transistor Tr2 and the capacitor C is used as the output voltage Vout. The voltages mentioned above fulfill the relations Vdd1>Vss1 and Vdd2>Vss2.

How this pixel works will be described briefly below. This pixel exploits the subthreshold characteristics that the transistor Tr1 exhibits when its gate-source voltage is lower than the threshold voltage. When the photodiode PD receives light and, as a result, a current Ip flows through the transistor Tr1, the gate voltage Vg of the transistor Tr1 varies natural-logarithmically in accordance with the current Ip. This gate voltage Vg causes a current to flow also through the transistor Tr2, and thus electric charge is accumulated in the capacitor C. As a result of this electric charge being accumulated in the capacitor C, the output voltage Vout appears, which is given as $$Vout = Vss1 + \frac{nkT}{q} \ln\left(\frac{q}{nkTC} \int Ipdt\right) \quad (1)$$

where q represents the amount of electric charge carried by an electron, k represents the Boltzmann constant, n represents a constant determined according to the structure of the transistor, T represents the absolute temperature, and C represents the capacitance of the capacitor C.

An image-sensing apparatus is equipped with a solid-state image-sensing device that has a plurality of pixels, each having a characteristic as described above, arranged in an array and that is further provided with transfer means for transferring the output voltages from the individual pixels. In such a solid-state image-sensing device, the individual pixels have different sensitivities, which are difficult to make completely even, and therefore, even if uniform light is shone on them, the voltages output from the individual pixels differ from one another. To overcome this problem, U.S. Pat. No. 5,289,286 proposes an image-sensing apparatus in which the differences in sensitivity among the individual pixels are compensated for.

The configuration of the image-sensing apparatus proposed in U.S. Pat. No. 5,289,286 mentioned above will be described briefly below with reference to FIG. 11, which shows a block diagram thereof. The image-sensing apparatus shown in FIG. 11 is composed of an image-sensing device (hereafter referred to as the "sensor") 1 that has a plurality of pixels each producing an output voltage varying natural-logarithmically in accordance with the amount of received light and that has transfer means for transferring the outputs from the individual pixels, an analog-to-digital converter (hereafter referred to as the "A/D converter") 2 for performing analog-to-digital conversion on the voltage output from the sensor 1, a memory 3 for storing the digital values (hereinafter referred to as the "shading data") obtained as a result of conversion performed by the A/D converter 2, a correction calculation circuit (hereafter referred to as the "COR") 4 for subtracting the shading data stored beforehand in the memory 3 from the image data fed from the A/D converter 2 during actual image sensing so as to correct the image data, and a device 5, such as a storage device or printer, that is fed with the image data corrected by the COR 4.

In this image-sensing apparatus configured as described above, first, uniform light is shone on the sensor 1, and, for each pixel, the digital data representing the output voltage obtained therefrom is stored in the memory 3. Then, during actual image sensing, the image data acquired is corrected on the basis of the above-mentioned digital data, called the shading data, that was stored in the memory 3 when uniform light was shone on the sensor 1, and the thus corrected image data is output to the device 5. By correcting the image data in this way, it is possible to correct the unevenness in sensitivity among the individual pixels of the sensor 1.

Figure 11:
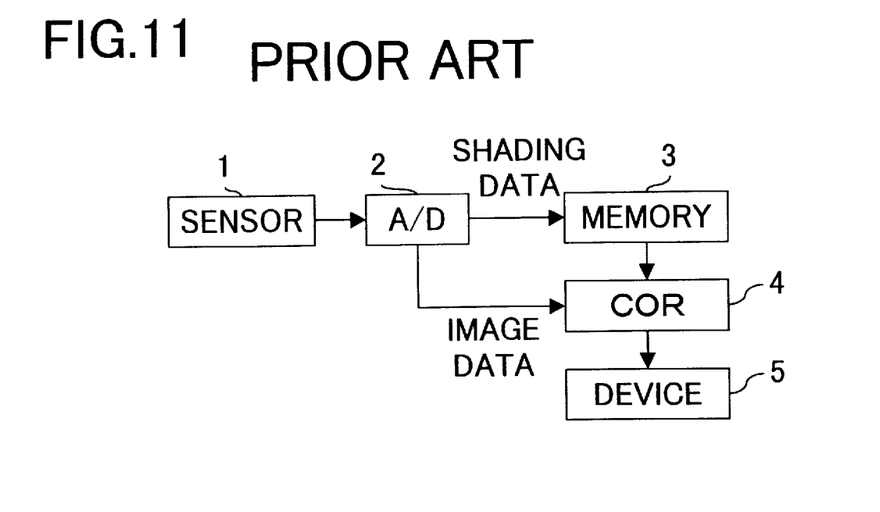
FIG. 11 is a block diagram showing the internal configuration of a conventional image-sensing apparatus.

However, in a conventional image-sensing apparatus configured as shown in FIG. 11, a large amount of data needs to be stored as shading data in the memory 3, because this data is obtained as constituting one full screen from the sensor 1. To permit such shading data, constituting one full screen, to be stored in the memory 3, the memory 3 needs to be given a large capacity. Inconveniently, giving the memory 3 a large capacity hampers miniaturization and cost reduction of the apparatus.

SUMMARY OF THE INVENTION

An object of the present invention is to provide an image-sensing apparatus in which shading data is stored after being compressed so as to minimize the memory capacity required for its storage.

To achieve the above object, according to the present invention, an image-sensing apparatus is provided with: a solid-state image-sensing device composed of a plurality of pixels each having a characteristic that that output voltage thereof varies natural-logarithmically in accordance with the amount of light received; a compressor for performing data compression on calibration data used to correct variations in the output voltages of the individual pixels of the solid-state image-sensing device; a memory for storing the calibration data compressed by the compressor; an expander for performing data decompression on the calibration data stored in the memory; and a calibrator for calibrating, in accordance with the calibration data decompressed by the expander, output data representing the output voltages obtained from the individual pixels of the solid-state image-sensing device during image sensing.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

First Embodiment

Figure 2:
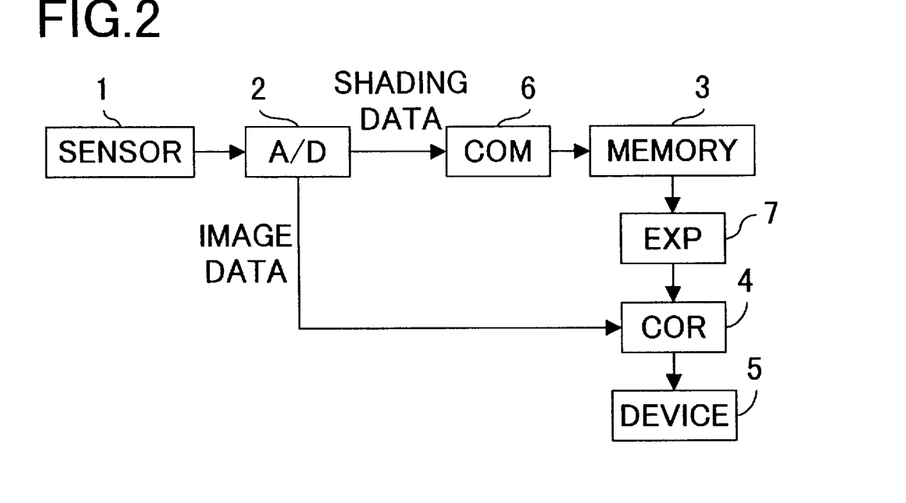
FIG. 2 is a block diagram showing the internal configuration of the image-sensing apparatus of a first embodiment of the invention.

A first embodiment of the invention will be described with reference to the drawings. FIG. 2 is a block diagram showing the internal configuration of the image-sensing apparatus of this embodiment. It is to be noted that, in FIG. 2, such circuit blocks as are used for the same purposes as in the image-sensing apparatus shown in FIG. 11 are identified with the same reference numerals, and their detailed description will be omitted.

The image-sensing apparatus shown in FIG. 2 has a solid-state image-sensing device (hereinafter referred to as the "sensor") 1 such as a CCD-type or CMOS-type solid-state image-sensing device, an A/D converter 2, a memory 3, a COR 4, a device 5, a compressor (hereinafter referred to as the "COM") 6 for performing data compression on shading data fed from the A/D converter 2, and an expander (hereinafter referred to as the "EXP") 7 for performing data decompression on data fed from the memory 3 to recover therefrom the original shading data.

Figure 3:
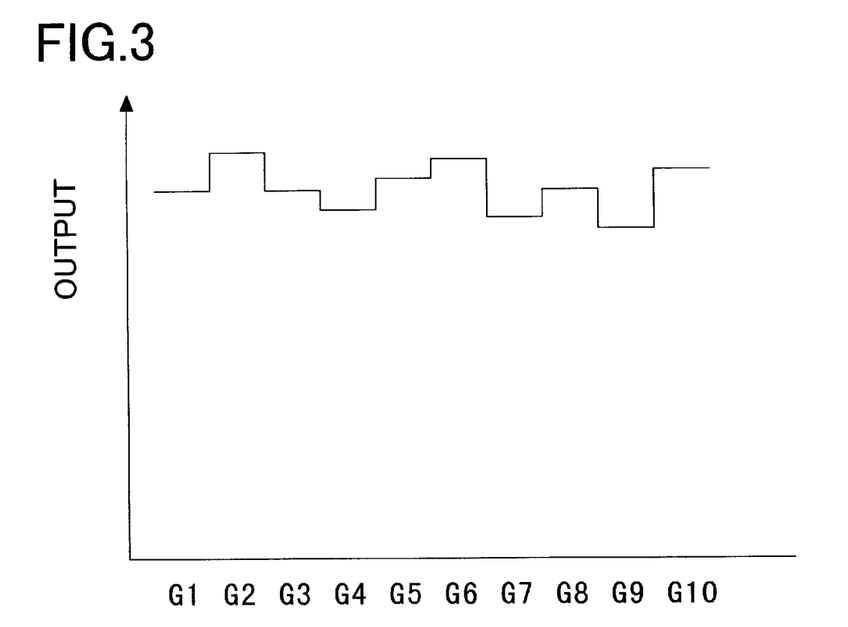
FIG. 3 is a diagram showing the outputs of the individual pixels when irradiated with uniform light.

This image-sensing apparatus configured as described above operates as follows. First, to acquire shading data, the sensor 1 is irradiated with uniform light of which the amount is L0. In this state, the output voltages of the individual pixels constituting the sensor 1 are converted into digital data by the A/D converter 2, and the obtained digital data is then fed to the COM 6. The COM 6 performs data compression on this digital data by a difference-based method. Specifically, suppose that irradiation with uniform light yields shading data as shown in FIG. 3. Here, for simplicity's sake, assume that ten pixels G1 to G10 yield shading data 90, 100, 90, 85, 93, 98, 83, 90, 80, and 95, respectively.

The COM 6, when fed with data consisting of a series of values [a, b, c], performs data compression by converting the data into data consisting of a series of values [a, b–a, c–b]. That is, when the COM 6 receives shading data consisting of a series of values [90, 100, 90, 85, 93, 98, 83, 90, 80, 95], it converts, by the difference-based method described just above, the data into data consisting of a series of values [90, 10, –10, –5, 8, 5, –15, 7, –10, 15]. The shading data thus subjected to data compression by the COM 6 is then fed to the memory 3 so as to be stored therein.

Figure 4:
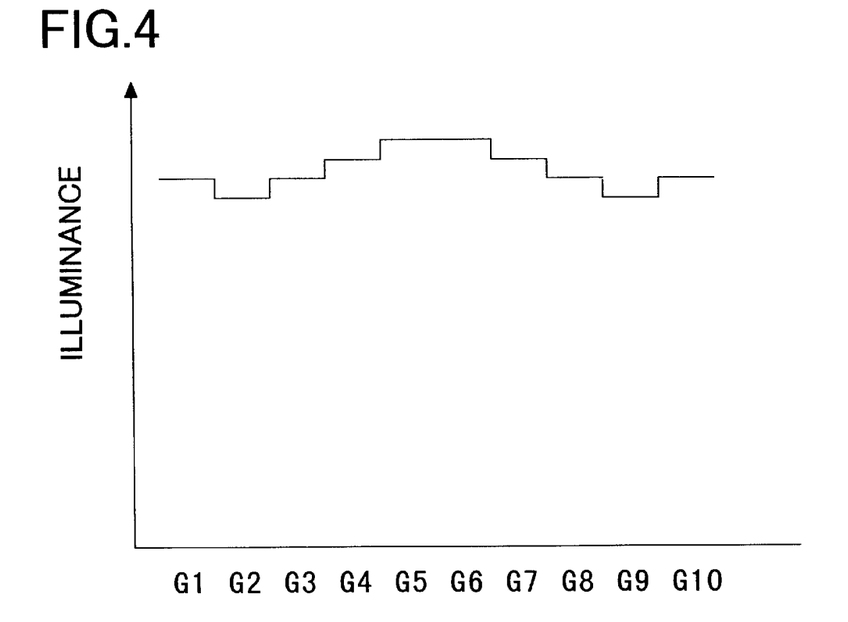
FIG. 4 is a diagram showing the illuminance of the light shone on the individual pixels.
Figure 5:
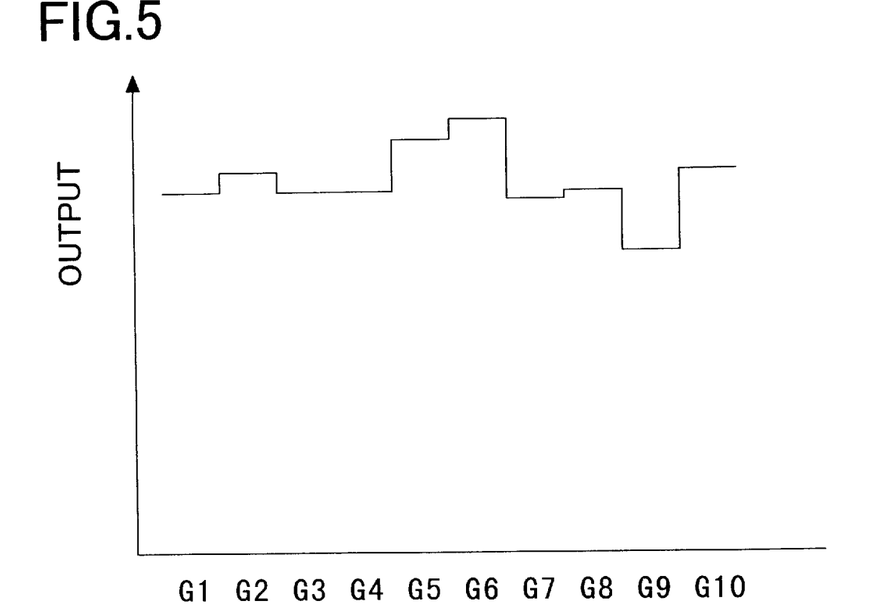
FIG. 5 is a diagram showing the outputs of the individual pixels.

With the compressed shading data stored in this way, the image-sensing apparatus, during image sensing, operates as follows. The image data acquired is fed, pixel by pixel, from the sensor 1 to the A/D converter 2, which then converts the image data into digital data. FIG. 4 shows the illuminance of the light shone on the individual pixels G1 to G10, and FIG. 5 shows the image data output from those pixels G1 to G10. In this state, the compressed shading data stored in the memory 3 is fed to the EXP 7. The EXP 7, when fed with data consisting of a series of values [a, b, c], performs data decompression by converting the data into data consisting of a series of values (a, a+b, a+b+c). That is, when the EXP 7 receives the data stored in the memory 3, which consists of a series of values (90, 10, –10, –5, 8, 5, –15, 7, –10, 15), it converts the data back into the original shading data consisting of a series of values (90, 100, 90, 85, 93, 98, 83, 90, 80, 95).

Figure 6:
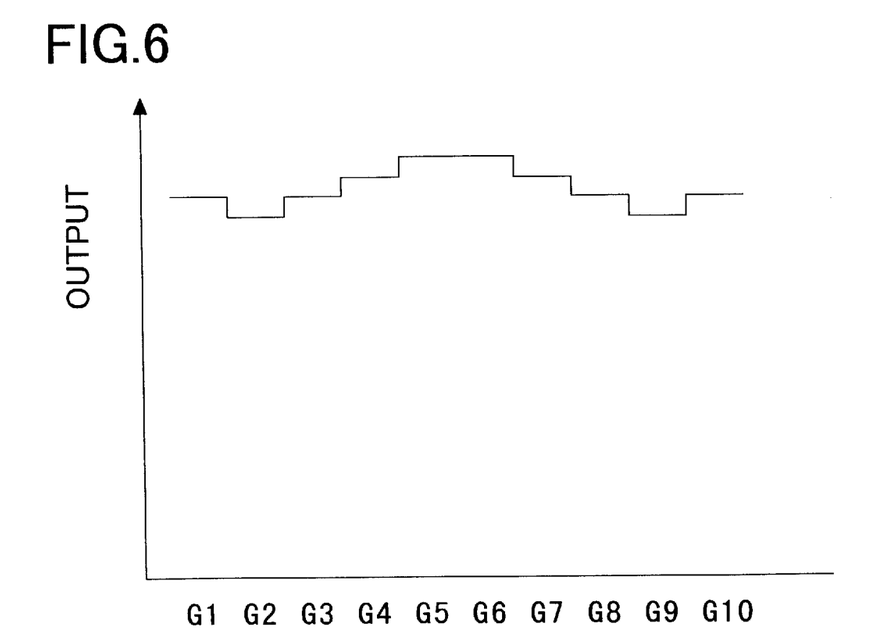
FIG. 6 is a diagram showing the outputs after correction.

In this way, the shading data decompressed back to its original form by the EXP 7 and the image data converted into digital data by the A/D converter 2 are both fed to COR 4. The COR 4 then subtracts the shading data from the image data. As a result, as shown in FIG. 6, the data of the individual pixels output from the COR 4 is, as data reflecting the illuminance of the light shone on the individual pixels as shown in FIG. 4, fed to the device 5. Although data compression is achieved by a difference-based method in this embodiment, it may be achieved by any other method such as a JPEG-conforming method.

Second Embodiment

Figure 7:
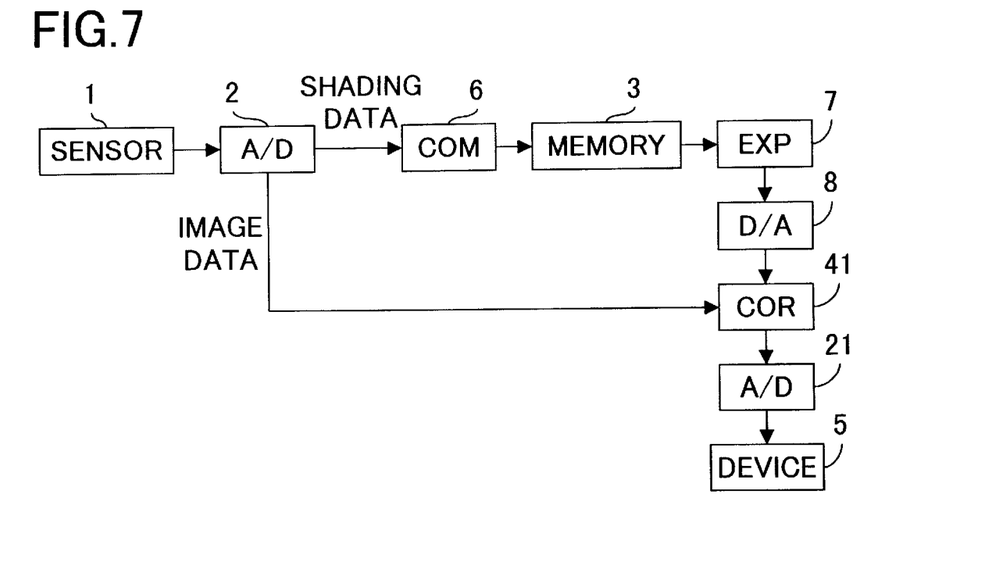
FIG. 7 is a block diagram showing the internal configuration of the image-sensing apparatus of a second embodiment of the invention.

A second embodiment of the invention will be described with reference to the drawings. FIG. 7 is a block diagram showing the internal configuration of the image-sensing apparatus of this embodiment. It is to be noted that, in FIG. 7, such circuit blocks as are used for the same purposes as in the image-sensing apparatus shown in FIG. 2 are identified with the same reference numerals, and their detailed description will be omitted.

The image-sensing apparatus shown in FIG. 7 has a sensor 1, an A/D converter 2, a memory 3, a device 5, a COM 6, an EXP 7, a digital-to-analog converter (hereinafter referred to as the "D/A converter") 8 for converting into analog data the shading data decompressed back to its original form by the EXP 7, a COR 41 for correcting the image data by subtracting therefrom the analog data of the shading data fed from the D/A converter 8, and an A/D converter 21 for converting into digital data the corrected image data output from the COR 41.

In this image-sensing apparatus configured as described above, as in the image-sensing apparatus of the first embodiment, the shading data obtained by irradiating the sensor 1 with uniform light is fed to the COM 6 so as to be subjected to data compression by a difference-based or other method. The shading data thus compressed by the COM 6 is then stored in the memory 3. With shading data acquired in this way, the image-sensing apparatus, during image sensing, operates as follows.

During image sensing, while the pixels of the sensor 1 output image data, the data stored in the memory 3 is decompressed back into the original shading data by the EXP 7. The shading data obtained as a result of data decompression by the EXP 7 is converted into analog data by the D/A converter 8. Then, the image data from the sensor 1 and the shading data converted into analog data by the D/A converter 8 are both fed to the COR 41.

The COR 41 then subtracts from the image data fed from the sensor 1 the shading data fed from the D/A converter 8. The image data thus corrected is then converted into digital data by the A/D converter 21, and is then fed to the device 5.

Third Embodiment

Figure 8:
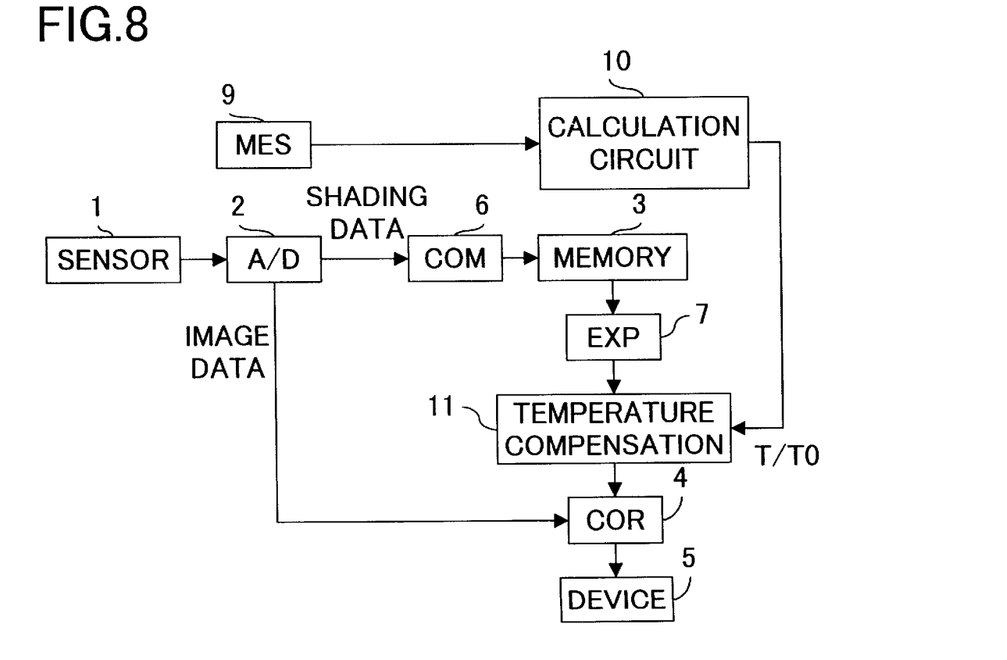
FIG. 8 is a block diagram showing the internal configuration of the image-sensing apparatus of a third embodiment of the invention.

A third embodiment of the invention will be described with reference to the drawings. FIG. 8 is a block diagram showing the internal configuration of the image-sensing apparatus of this embodiment. It is to be noted that, in FIG. 8, such circuit blocks as are used for the same purposes as in the image-sensing apparatus shown in FIG. 2 are identified with the same reference numerals, and their detailed description will be omitted.

The image-sensing apparatus shown in FIG. 8 has a solid-state image-sensing device (hereinafter referred to as the "sensor") 1 such as a CCD-type or CMOS-type solid-state image-sensing device, an A/D converter 2, a memory 3, a COR 4, a device 5, a COM 6, an EXP 7, a temperature detector (hereinafter referred to as the "MES") 9 for detecting the temperature of the sensor 1 using a temperature sensor such as a thermocouple or thermistor, a calculation circuit 10 for storing the reference temperature T0 detected by the MES 9 when shading data is acquired with uniform light shone on the sensor 1 and for calculating the ratio T/T0 of the temperature T of the sensor 1 detected by the MES 9 during image sensing to the reference temperature T0, and a temperature compensation circuit 11 for multiplying the shading data fed from the EXP 7 by the ratio T/T0 fed from the calculation circuit 10 and for feeding the resulting data to COR 4.

This image-sensing apparatus configured as described above operates as follows. First, to acquire shading data, the sensor 1 is irradiated with uniform light of which the amount is L0. In this state, the output voltages of the individual pixels constituting the sensor 1 are converted into digital data by the A/D converter 2, and this digital data is subjected to data compression by the COM 6 and then stored in the memory 3. Simultaneously, the temperature T0 of the sensor 1 detected by the MES 9 is fed to the calculation circuit 10, and is stored as a reference temperature in a memory (not shown) within the calculation circuit 10. In this way, compressed shading data is acquired. Here, the output voltage V(T0) of the shading data obtained from a pixel having a sensitivity of α is given by equation (2) below.

$$V(T0) = Vss1 + \frac{nkT0}{q}\ln\left(\frac{q}{nkT0 \cdot C}\int L0 \cdot \alpha \, dt\right) \quad (2)$$

With the compressed shading data and the reference temperature T0 stored in this way, the image-sensing apparatus, during image sensing, operates as follows. The image data acquired is fed, pixel by pixel, from the sensor 1 to the A/D converter 2, which then converts the image data into digital data. Simultaneously, the MES 9 detects the temperature T of the sensor 1, and the calculation circuit 10 calculates the ratio T/T0 of the temperature T thus detected to the reference temperature T0. The output voltage V(T) of the image data acquired here is given by equation (3) below.

$$V(T) = Vss1 + \frac{nkT}{q}\ln\left(\frac{q}{nkTC}\int L \cdot \alpha \, dt\right) \quad (3)$$

Then, the shading data of the pixels that have output the image data, as obtained as a result of the EXP 7 performing data decompression on the data fed from the memory 3, is fed to the temperature compensation circuit 11, and also the temperature ratio T/T0 is fed from the calculation circuit 10 to the temperature compensation circuit 11. The temperature compensation circuit 11 multiplies the shading data by the temperature ratio T/T0. Thus, the output voltage of the shading data is made to have a voltage V1(T0) given by equation (4) below.

$$V1(T0) = \frac{T}{T0}Vss1 + \frac{nkT}{q}\ln\left(\frac{q}{nkT0 \cdot C}\int L0 \cdot \alpha \, dt\right) \quad (4)$$

In this way, the shading data multiplied by the temperature ratio by the temperature compensation circuit 11 is fed to the COR 4, and the image data converted into digital data by the A/D converter 2 is also fed to the COR 4. Then, the COR 4 subtracts the shading data from the image data. Thus, the output voltage of the image data is made to have a voltage V1(T) given by equation (5) below.

$$V1(T) = \left(1 - \frac{T}{T0}\right)Vss1 + \frac{nkT}{q}\ln\left(\frac{T0}{T} \cdot \frac{\int L \cdot dt}{\int L0 \cdot dt}\right) \quad (5)$$

As equation (5) clearly indicates, the voltage V1(T) does not include the sensitivity α of the pixel as a parameter, which means that the unevenness in sensitivity among the individual pixels is completely corrected in the image data obtained ultimately. The thus corrected image data is then fed to the device 5.

In this embodiment, the image data is converted into digital data, and this digital data is corrected. However, it is also possible, as in the second embodiment, to feed the output of the sensor directly to the COR, and then subtract therefrom the data obtained by performing temperature compensation and then digital-to-analog conversion on the shading data obtained from the EXP. In this case, the data output from the COR is converted into digital data and is then fed to the device.

Fourth Embodiment

Figure 9:
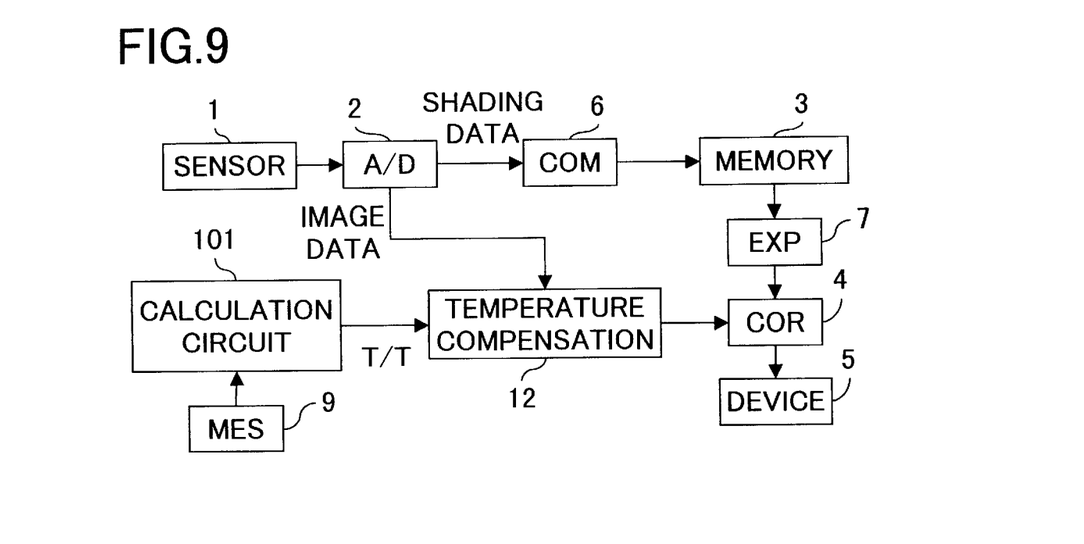
FIG. 9 is a block diagram showing the internal configuration of the image-sensing apparatus of a fourth embodiment of the invention.

A fourth embodiment of the invention will be described with reference to the drawings. FIG. 9 is a block diagram showing the internal configuration of the image-sensing apparatus of this embodiment. It is to be noted that, in FIG. 9, such circuit blocks as are used for the same purposes as in the image-sensing apparatus shown in FIG. 8 are identified with the same reference numerals, and their detailed description will be omitted.

The image-sensing apparatus shown in FIG. 9 has a sensor 1, an A/D converter 2, a memory 3, a COR 4, a device 5, a COM 6, an EXP 7, a MES 9, a calculation circuit 101 for storing the reference temperature T0 detected by the MES 9 when shading data is acquired with uniform light shone on the sensor 1 and for calculating the ratio T0/T of the reference temperature T0 to the temperature T of the sensor 1 detected by the MES 9 during image sensing, and a temperature compensation circuit 12 for multiplying the image data fed from the A/D converter 2 by the ratio T0/T fed from the calculation circuit 101 and then feeding the resulting data to the COR 4.

This image-sensing apparatus configured as described above operates as follows. First, as in the image-sensing apparatus of the first embodiment, shading data acquired while the sensor 1 is irradiated with uniform light of which the amount is L0 is subjected to data compression by the COM 6 and then stored in the memory 3, and the reference temperature T0 is stored in the calculation circuit 101. Here, the output voltage V(T0) of the shading data obtained from a pixel having a sensitivity of a is given, as in the third embodiment, by equation (2) noted earlier.

With the compressed shading data and the reference temperature T0 stored in this way, the image-sensing apparatus, during image sensing, operates as follows. The image data acquired is fed, pixel by pixel, from the sensor 1 to the A/D converter 2, which then converts the image data into digital data. Simultaneously, the MES 9 detects the temperature T0 of the sensor 1, and the calculation circuit 101 calculates the ratio T0/T of the reference temperature T0 to the temperature T thus detected. The output voltage V(T) of the image data acquired here is given, as in the first embodiment, by equation (3) noted earlier.

Then, the image data and the temperature ratio T0/T are fed from the A/D converter 2 and the calculation circuit 101, respectively, to the temperature compensation circuit 12. The temperature compensation circuit 12 multiplies the image data by the temperature ratio T0/T. Thus, the output voltage of the image data is made to have a voltage V2(T) given by equation (6) below.

$$V2(T) = \frac{T0}{T} Vss1 + \frac{nkT0}{q} \ln\left(\frac{q}{nkTC} \int L \cdot \alpha \, dt\right) \qquad (6)$$

In this way, the image data multiplied by the temperature ratio by the temperature compensation circuit 12 is fed to the COR 4, and also the shading data of the pixels that have output the image data, as obtained by subjecting the data fed from the memory 3 to data decompression, is fed to the COR 4. Then, the COR 4 subtracts the shading data from the image data. Thus, the output voltage of the image data is made to have a voltage V3(T) given by equation (7) below.

$$V3(T) = \left(\frac{T0}{T} - 1\right) Vss1 + \frac{nkT0}{q} \ln\left(\frac{T0}{T} \cdot \frac{\int L \cdot dt}{\int L0 \cdot dt}\right) \qquad (7)$$

As equation (7) clearly indicates, the voltage V3(T) does not include the sensitivity a of the pixel as a parameter, which means that the unevenness in sensitivity among the individual pixels is completely corrected in the image data obtained ultimately. The thus corrected image data is then fed to the device 5.

In this embodiment, the image data is converted into digital data, and this digital data is corrected. However, it is also possible, as in the second embodiment, to subject the output of the sensor directly to temperature compensation, then feed it to the COR, and then subtract therefrom the data obtained by performing digital-to-analog conversion on the shading data obtained from EXP. In this case, the data output from the COR is converted into digital data and is then fed to the device.

In practicing the present invention, the circuits and components other than the device 5 may be formed integrally as a one-chip semiconductor device. When, as in the third embodiment, temperature compensation is performed on the shading data, the second term (nkT)/q of equation (5) varies with temperature, and thus the contrast of the ultimately obtained image varies accordingly. On the other hand, when, as in the fourth embodiment, temperature compensation is performed on the image data, the second term (nkT0)q of equation (7) is constant irrespective of temperature, and thus the contrast of the ultimately obtained image also reflects the compensation performed. Moreover, as in the second embodiment, by first subjecting the image data to correction using the shading data and then converting it into digital data, it is possible to convert full-range data into digital signals without sacrificing the resolution of the original data.

In any of the first to fourth embodiments, the image-sensing apparatus may be so configured as to have a plurality of compression rates so that the compression rate at which the COM 6 compresses the shading data to be stored in the memory 3 is switchable among them. In this case, for example, a high-resolution mode for high-resolution display of images and a standard mode are provided, and these modes are switched in such a way that a low compression rate is used in the high-resolution mode and a high compression rate is used in the standard mode. Moreover, the image-sensing apparatus may be so configured as to have a plurality of compression methods stored therein so that the compressing method by which the COM 6 compresses the shading data is switchable among them. In this case, one of those compression methods is selected according to the type of image currently being sensed in such a way as to minimize the amount of data to be stored in the memory 3.

Example of Application of an Image-Sensing Apparatus of the Invention

Figure 10:
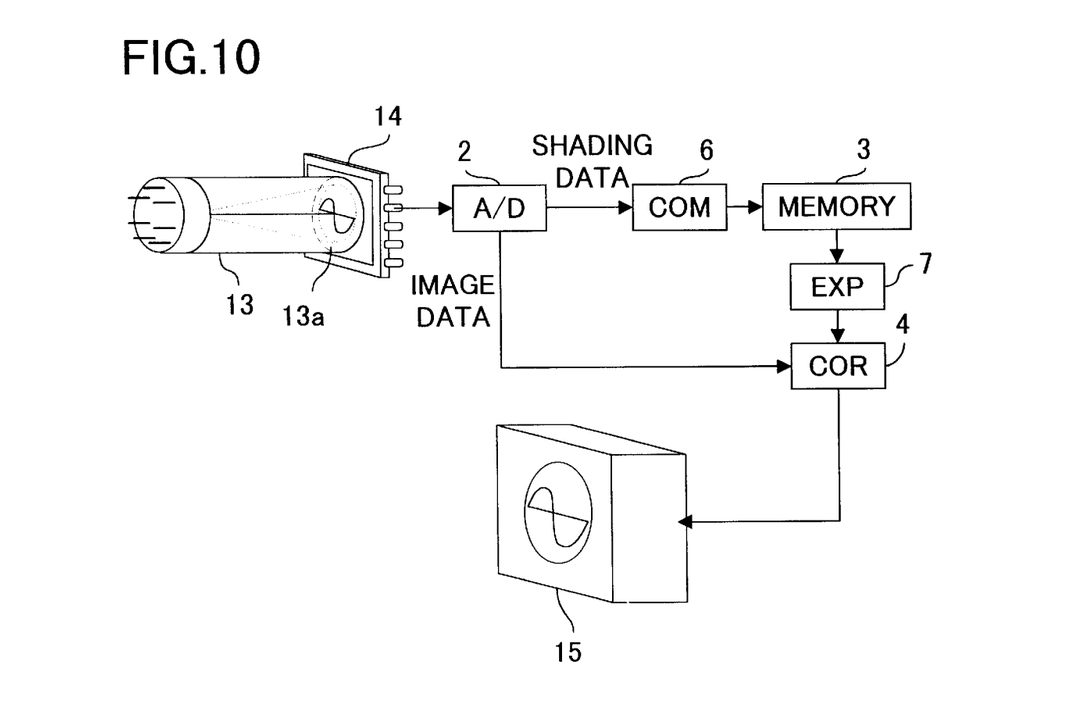
FIG. 10 is a block diagram showing the internal configuration of an oscilloscope incorporating an image-sensing apparatus embodying the invention.

An example of application of an image-sensing apparatus embodying the invention employed in an oscilloscope will now be described, taking up the image-sensing apparatus of the first embodiment as a representative. FIG. 10 is a block diagram showing the internal configuration of an oscilloscope incorporating the image-sensing apparatus of the first embodiment.

The oscilloscope shown in FIG. 10 has a waveform reproducing picture tube 13 that, on the basis of a current or voltage signal detected via a probe (not shown) or the like, displays the waveform of the signal with a light beam, a light sensor 14 held in contact with the fluorescent surface 13a of the waveform reproducing picture tube 13, and a display 15 for displaying the waveform according to the image data corrected by the operation of an A/D converter 2, a memory 3, a COR 4, a COM 6, and an EXP 7.

In this oscilloscope configured as described above, the waveform presented with a light beam on the fluorescent surface 13a in the waveform reproducing picture tube 13 is read by the light sensor 14 having pixels that produce their outputs logarithmically. As described earlier, beforehand, this light sensor 14 has been irradiated with uniform light, and the shading data of the individual pixels obtained meanwhile has been compressed by the COM 6 and stored in the memory 3. When the image data of the waveform presented on the fluorescent surface 13a is read by the individual pixels of the light sensor 14, the COR 4 corrects the thus read image data by subtracting therefrom the shading data obtained as a result of the EXP 7 decompressing the data stored in the memory 3. The image data thus corrected is fed to the display 15, so that the waveform is displayed thereon.

As described above, according to the present invention, shading data obtained from a solid-state image-sensing device with uniform light shone thereon is stored after being compressed. This helps save the capacity of a memory used to store the shading data. Moreover, reducing the capacity of a memory helps reduce the electric power consumption thereof. Furthermore, reducing the capacity of a memory also helps reduce the cost thereof.

What is claimed is:

1. An image-sensing apparatus comprising:
    a solid-state image-sensing device composed of a plurality of pixels each having a characteristic that an output voltage thereof varies natural-logarithmically in accordance with an amount of light received;
    a compressor for performing data compression on calibration data used to correct variations in the output voltages of the individual pixels of the solid-state image-sensing device;
    a memory for storing the calibration data compressed by the compressor;
    an expander for performing data decompression on the calibration data stored in the memory; and
    a calibrator for calibrating, in accordance with the calibration data decompressed by the expander, output data representing the output voltages obtained from the individual pixels of the solid-state image-sensing device during image sensing.

2. An image-sensing apparatus as in claim 1, wherein the calibration data represents the output voltages obtained from the individual pixels of the solid-state image-sensing device when the solid-state image-sensing device is irradiated with uniform light.

3. An image-sensing apparatus as in claim 2, further comprising:
    a temperature detector for detecting a temperature of the solid-state image-sensing device; and
    a temperature compensator for calculating a difference between the temperatures of the solid-state image-sensing device as measured by the temperature detector during uniform-light irradiation and during image sensing, then correcting based upon the thus calculated difference the calibration data decompressed by the expander, and then feeding correction results to the calibrator.

4. An image-sensing apparatus as in claim 2, further comprising:
    a temperature detector for detecting a temperature of the solid-state image-sensing device; and
    a temperature compensator for calculating a difference between the temperatures of the solid-state image-sensing device as measured by the temperature detector during uniform-light irradiation and during image sensing, then correcting based upon the thus calculated difference the output data obtained from the solid-state image-sensing device during image sensing, and then feeding correction results to the calibrator.

5. An image-sensing apparatus as in claim 1, wherein a compression rate at which the compressor performs data compression is switchable among a plurality of compression rates.

6. An image-sensing apparatus as in claim 1, wherein a method by which the compressor performs data compression is selected from among a plurality of methods provided therein.

7. An image-sensing apparatus as in claim 1, wherein the calibration data is compressed by the compressor using a difference-based compression method.

8. An image-sensing apparatus comprising:
    a solid-state image-sensing device composed of a plurality of pixels each having an output voltage that varies in accordance with an amount of light received;
    a compressor for performing data compression on calibration data used to correct variations in the output voltages of the individual pixels of the solid-state image-sensing device;
    a memory for storing the calibration data compressed by the compressor;
    an expander for performing data decompression on the calibration data stored in the memory; and
    a calibrator for calibrating, in accordance with the calibration data decompressed by the expander, output data representing the output voltages obtained from the individual pixels of the solid-state image-sensing device during image sensing.

9. An image-sensing apparatus as in claim 8, wherein the calibration data represents the output voltages obtained from the individual pixels of the solid-state image-sensing device when the solid-state image-sensing device is irradiated with uniform light.

10. An image-sensing apparatus as in claim 9, further comprising:
    a temperature detector for detecting a temperature of the solid-state image-sensing device; and
    a temperature compensator for calculating a difference between the temperatures of the solid-state image-sensing device as measured by the temperature detector during uniform-light irradiation and during image sensing, then correcting based upon the thus calculated difference the calibration data decompressed by the expander, and then feeding correction results to the calibrator.

11. An image-sensing apparatus as in claim 9, further comprising:
    a temperature detector for detecting a temperature of the solid-state image-sensing device; and
    a temperature compensator for calculating a difference between the temperatures of the solid-state image-sensing device as measured by the temperature detector during uniform-light irradiation and during image sensing, then correcting based upon the thus calculated difference the output data obtained from the solid-state image-sensing device during image sensing, and then feeding correction results to the calibrator.

12. An image-sensing apparatus as in claim 8, wherein a compression rate at which the compressor performs data compression is switchable among a plurality of compression rates.

13. An image-sensing apparatus as in claim 8, wherein a method by which the compressor performs data compression is selected from among a plurality of methods provided therein.

14. An image-sensing apparatus as in claim 8, wherein the output voltage of said pixels varies natural-logarithmically in accordance with the amount of light received.

15. An image-sensing apparatus as in claim 14 wherein the output voltage of said pixels varies according to the formula:

$$Vout = Vss1 + \frac{nkT}{q}\ln\left(\frac{q}{nkTC}\int Ipdt\right)$$

where, Vss1 is a reference potential
n represents a constant determined according to the structure of the transistor,
q is the charge of one electron,
k is the Boltzman constant,
T is the absolute temperature,
C is the capacitance of a capacitor within the pixel, and
Ip is a current caused by light impacting the pixel.

16. An image-sensing apparatus as in claim 8, wherein the calibration data is compressed by the compressor using a difference-based compression method.

17. An image-sensing apparatus comprising:
a solid-state image-sensing device composed of a plurality of pixels each having an output voltage that varies in accordance with an amount of light received;
a compressor for performing data compression on calibration data used to correct variations in the output voltages of the individual pixels of the solid-state image-sensing device;
a memory for storing the calibration data compressed by the compressor;
an expander for performing data decompression on the calibration data stored in the memory;
a calibrator for calibrating, in accordance with the calibration data decompressed by the expander, output data representing the output voltages obtained from the individual pixels of the solid-state image-sensing device during image sensing;
a temperature detector for detecting a temperature of the solid-state image-sensing device; and
a temperature compensator for calculating a difference between the temperatures of the solid-state image-sensing device as measured by the temperature detector during uniform-light irradiation and during image sensing and correcting the calibration data in accordance with the difference.

18. An image-sensing apparatus as in claim 17, wherein the calibration data represents the output voltages obtained from the individual pixels of the solid-state image-sensing device when the solid-state image-sensing device is irradiated with uniform light.

19. An image-sensing apparatus as in claim 18, wherein the temperature compensator calculates a ratio between the temperatures of the solid-state image-sensing device as measured by the temperature detector during uniform light irradiation and during image sensing, and corrects the calibration data by multiplying the calibration data by the ratio, and then feeding multiplication results to the calibrator.

20. An image-sensing apparatus as in claim 18, wherein the temperature compensator calculates a ratio between the temperatures of the solid-state image-sensing device as measured by the temperature detector during uniform light irradiation and during image sensing, and corrects the output data by multiplying the output data obtained from the solid-state image-sensing device during image sensing by the ratio, and then feeding multiplication results to the calibrator.

21. An image-sensing apparatus as in claim 17, wherein a compression rate at which the compressor performs data compression is switchable among a plurality of compression rates.

22. An image-sensing apparatus as in claim 17, wherein a method by which the compressor performs data compression is selected from among a plurality of methods provided therein.

23. An image-sensing apparatus as in claim 17, wherein the output voltage of said pixels varies natural-logarithmically in accordance with the amount of light received.

24. An image-sensing apparatus as in claim 23 wherein the output voltage of said pixels varies according to the formula:

$$Vout = Vss1 + \frac{nkT}{q}\ln\left(\frac{q}{nkTC}\int Ipdt\right)$$

where, Vss1 is a reference potential
n represents a constant determined according to the structure of the transistor,
q is the charge of one electron,
k is the Boltzman constant,
T is the absolute temperature,
C is the capacitance of a capacitor within the pixel, and
Ip is a current caused by light impacting the pixel.

25. An image-sensing apparatus as in claim 17 wherein, the calibration data is compressed by the compressor using a difference-based compression method.

26. A method for sensing an image, comprising the steps of:
providing a solid-state image-sensing device composed of a plurality of pixels each having an output voltage that varies in accordance with an amount of light received;
performing data compression on calibration data used to correct variations in the output voltages of the individual pixels of the solid-state image-sensing device;
storing the calibration data compressed by the compressor;
performing data decompression on the calibration data stored in the memory; and
calibrating, in accordance with the calibration data decompressed by the expander, output data representing the output voltages obtained from the individual pixels of the solid-state image-sensing device during image sensing.

* * * * *